United States Patent [19]

Nguyen

[11] Patent Number: 4,699,756
[45] Date of Patent: Oct. 13, 1987

[54] FULL LENGTH CONTROL ROD EMPLOYING AXIALLY INHOMOGENEOUS ABSORBER MATERIALS FOR ZERO REACTIVITY REDISTRIBUTION FACTOR

[75] Inventor: Tho Q. Nguyen, Pittsburgh, Pa.

[73] Assignee: Westinghouse Electric Corp., Pittsburgh, Pa.

[21] Appl. No.: 763,736

[22] Filed: Aug. 8, 1985

[51] Int. Cl.⁴ .............................................. G21C 7/10
[52] U.S. Cl. ................................................. 376/333
[58] Field of Search ........................ 376/333, 327, 339

[56] References Cited

U.S. PATENT DOCUMENTS

| | | |
|---|---|---|
| 3,088,898 | 5/1963 | Busby et al. . |
| 3,230,147 | 1/1966 | Hitchcock ............................. 376/333 |
| 3,255,086 | 6/1966 | Hitchcock . |
| 3,257,286 | 6/1966 | Ryon et al. .......................... 376/338 |
| 3,267,002 | 8/1966 | Fromm, Jr. et al. ................ 376/333 |
| 3,485,717 | 12/1969 | Eich . |
| 3,519,535 | 7/1970 | French et al. . |
| 3,734,825 | 5/1973 | Schabert et al. . |
| 3,929,565 | 12/1975 | Fredin et al. ....................... 376/327 |
| 4,123,328 | 10/1978 | Radkowsky et al. . |
| 4,169,759 | 10/1979 | Bevilacqua . |
| 4,169,760 | 10/1979 | Bevilacqua ......................... 376/333 |
| 4,172,762 | 10/1979 | Anthony et al. .................... 376/333 |

FOREIGN PATENT DOCUMENTS

| | | |
|---|---|---|
| 175455 | 3/1986 | European Pat. Off. . |
| 1353235 | 1/1964 | France ................................. 376/333 |
| 2321174 | 3/1977 | France . |
| 25191178 | 7/1983 | France . |
| 2570214 | 3/1986 | France . |
| 2900801 | 7/1979 | Fed. Rep. Germany . |
| 0011387 | 2/1981 | Japan .................................. 376/339 |
| 0042491 | 3/1984 | Japan .................................. 376/333 |
| 0136680 | 8/1984 | Japan .................................. 376/333 |

Primary Examiner—Harvey E. Behrend

[57] ABSTRACT

A neutron absorber control rod for use in a fuel assembly of a nuclear reactor includes an elongated hollow tubular member having opposite ends and a hermetically sealed chamber defined therein between its opposite ends, one of the member ends being a leading end and the other of the member ends being a trailing end upon insertion of the control rod into the fuel assembly. A first neutron absorber material in the form of boron carbide pellets is contained in the chamber and located nearer to trailing than to the leading end of the member, whereas a second neutron absorber material in the form of silver-indium-cadmium pellets is contained in the chamber and located nearer to the leading than to the leading end of the member. The second neutron absorber material has a length approximately three times longer than that of the first neutron absorber material.

6 Claims, 2 Drawing Figures

4,699,756

FULL LENGTH CONTROL ROD EMPLOYING AXIALLY INHOMOGENEOUS ABSORBER MATERIALS FOR ZERO REACTIVITY REDISTRIBUTION FACTOR

CROSS REFERENCE TO RELATED APPLICATIONS

Reference is hereby made to the following copending U.S. applications dealing with related subject matter and assigned to the assignee of the present invention:

1. "A Nuclear Reactor Control Rod Having A Reduced Worth Tip" by John F. Wilson et al, assigned U.S. Ser. No. 633,774 and filed July 24, 1984 (W.E. 51,888).
2. "Light Water Moderator Rod For A Nuclear Reactor" by P. K. Doshi et al, assigned U.S. Ser. No. 654,709 and filed Sept. 26, 1984 (W.E. 52,140).
3. "Soluble Burnable Absorber Rod For A Nuclear Reactor" by P. K. Doshi et al, assigned U.S. Ser. No. 654,625 and filed Sept. 26, 1984 (W.E. 52,141).

BACKGROUND OF THE INVENTION

1. Field of the Invention

The present invention relates generally to nuclear reactors, and more particularly, is concerned with an improved control rod for use with a nuclear fuel assembly in reactor shutdown.

2. Description of the Prior Art

In a typical nuclear reactor, the reactor core includes a large number of fuel assemblies each of which is composed of top and bottom nozzles with a plurality of elongated transversely spaced guide thimbles extending between the nozzles and a plurality of tranverse grids axially spaced along the guide thimbles. Also, each fuel assembly is composed of a plurality of elongated fuel elements or rods transversely spaced apart from one another and from the guide thimbles and supported by the grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. One common way of doing this is by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles. Representative of the prior art are the control rods and systems disclosed in U.S. Pats. Nos. to Busby et al (3,088,898), Hitchcock (3,230,147 and 3,255,086), Eich (3,485,717), French et al (3,519,535), Schabert et al (3,734,825), Radkowsky et al (4,123,328), Bevilacqua (4,169,759) and Anthony et al (4,172,762).

One common arrangement utilizing control rods in association with a fuel assembly can be seen in U.S. Pat. No. 4,326,919 to Hill and assigned to the assignee of the present invention. This patent shows an array of control rods supported at their upper ends by a spider assembly, which in turn is connected to a control rod drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube. Generally, the neutron absorbing material is one having a high neutron absorption cross section, such as boron carbide, tantalum, a combination of silver-indium-cadmium, or many others well known in the art. The material is ordinarily in the form of a stack of closely packed ceramic or metal pellets which only partially fill the tube, leaving a void space or axial gap between the top of the pellets and the upper end plug which defines a plenum chamber for receiving gasses generated during the control operation. A coil spring is disposed within this plenum chamber and held in a state of compression between the upper end plug and the top pellet so as to maintain the stack of pellets in their closely packed arrangement during stepping of the control rod.

At end of cycle life (EOL) and hot zero power (HZP) core condition in reactors, an adverse power (flux) distribution shift to the top of the core commonly occurs. For instance, the axial flux imbalance (AFI) for a typical pressurized water reactor is on the order of 50 to 60%. With such extreme AFI, there is significant reactivity redistribution which nuclear designers have to account for in accident analysis via a reactivity penalty on available rod worth. The penalty, commonly known as reactivity redistribution factor (RRF), is approximately 0.85% delta p at EOL and accounted for in the shutdown margin calculation.

The control rod designs used heretofore have failed to adequately alter this imbalance in the core axial power distribution at reactor shutdown. Consequently, a need exists for a control rod design which will counteract this situation so as to substantially reduce RRF during reactor shutdown.

SUMMARY OF THE INVENTION

The present invention provides a control rod employing axially inhomogeneous absorber material designed to satisfy the aforementioned need. Unlike the prior art control rods, the control rod of the present invention has stronger absorber material placed in the upper, approximately 25%, of the rod than in the lower three-quarters thereof. With this design concept, the heavier worth control rod absorber material will push the HZP, EOL flux shape to the more typical hot full power shape which is reasonably balanced at the middle portion of the reactor core. In such manner, the need for RRF penalty is eliminated. This design is used for all control rods in the core including shutdown banks. As mentioned earlier, the AFI at HZP and EOL with prior art homogeneous control rods is approximately 60%. With the heavier absorber material in the upper 25%, the AFI at the same conditions becomes 4% only.

Accordingly, the present invention sets forth in a fuel assembly for a nuclear reactor including a plurality of guide thimbles and a plurality of nuclear fuel rods spaced apart from one another and from the guide thimbles and grouped together in an array organized to generate a neutron flux in the fuel assembly, an improved control rod for insertion into at least one of the guide thimbles for regulating the reactor neutron flux. The improved control rod is composed of: (a) an elongated hollow tubular member having opposite ends and a hermetically sealed chamber defined therein between its opposite ends, one of the member ends being a leading end and the other of the member ends being a trailing end upon insertion of the control rod into the fuel assembly; (b) a first plurality of neutron absorbe material pellets contained in the chamber and located nearer to the trailing than to the leading end of the member; and (c) a second plurality of neutron absorber material pellets contained in the chamber and located nearer to the leading than to the leading end of the member.

More particularly, the first neutron absorber material, preferably being boron carbide, has a higher neutron absorption cross section than that of the second neutron absorber material, which preferably is silver-indium-cadmium. Also, the second neutron absorber material is greater in quantity than that of the first neutron absorber material. Particularly, the quantities of the first and second neutron absorber materials are represented by the respective lengths thereof. The length of the second material is approximately three times longer than that of the first material.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
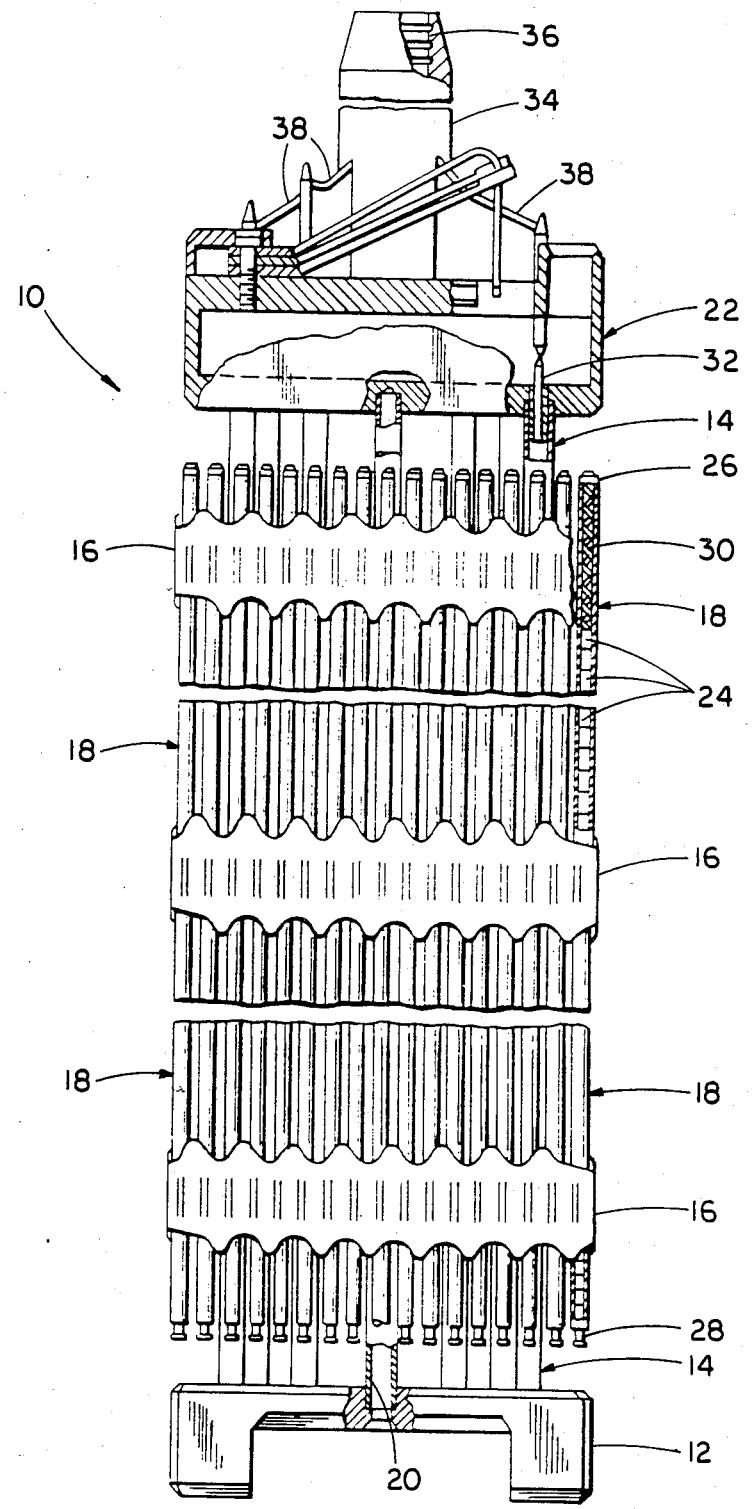
FIG. 1 is an elevational view, partly in section, of a fuel assembly in which the control rods of the present invention are intended to be employed, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Control Rod with Axially Inhomogeneous Absorber Material

Figure 2:
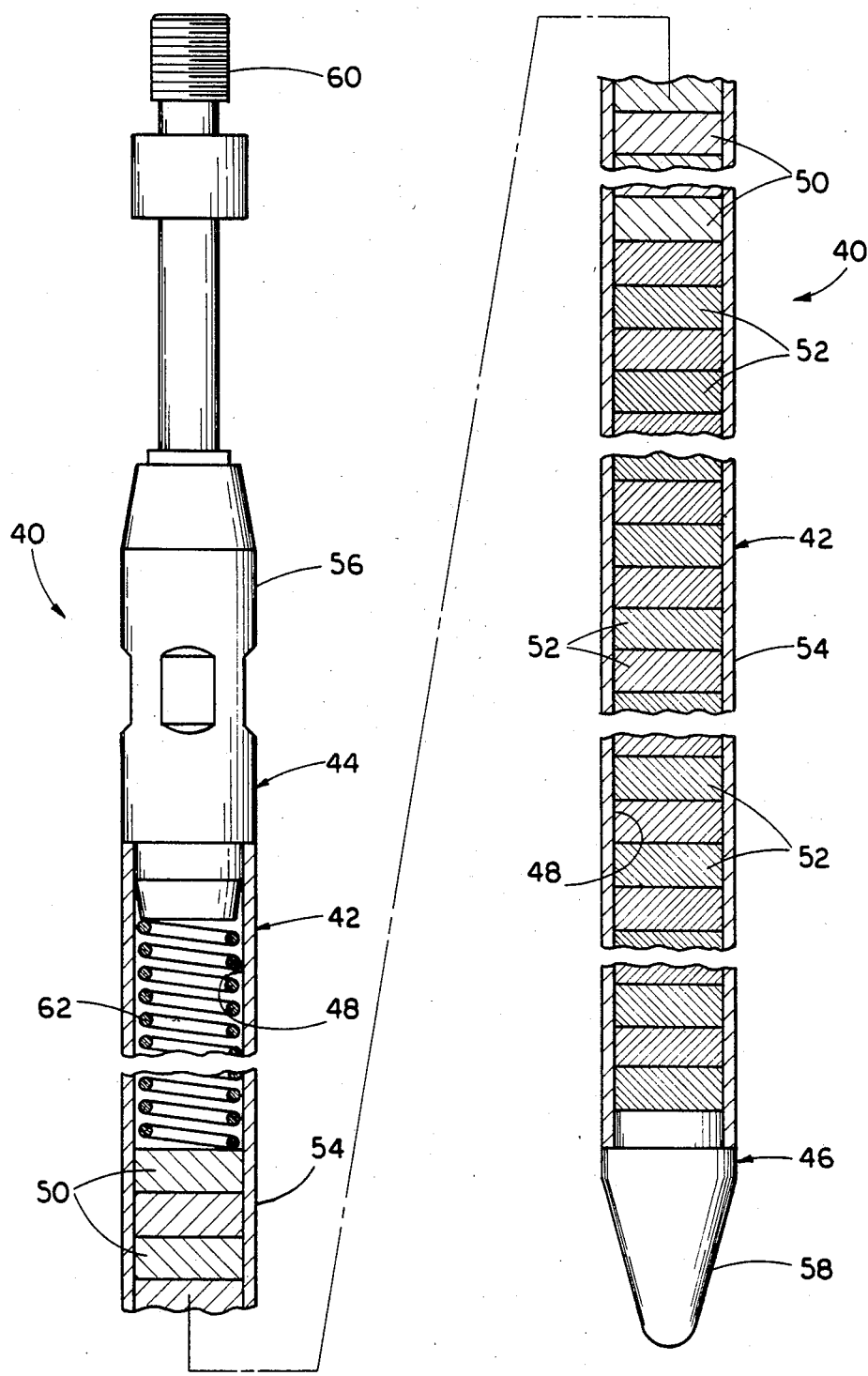
FIG. 2 is an enlarged, vertically foreshortened, sectional view of the improved control rod of the present invention.

Turning now to FIG. 2, there is shown the improved control rod of the present invention, generally designated 40, which is adapted to be used in EOL leading up to reactor shutdown. For example, at the fifteen year control rod changeover of some reactor cores, the control rods 32 used in earlier core cycles would be replaced by the control rod 40 of the present invention.

The improved control rod 40 which employs axially inhomogeneous absorber material basically includes an elongated hollow tubular member 42 having upper and lower opposite ends 44,46 and a hermetically sealed chamber 48 defined within the tubular member between its opposite ends. The lower end 46 is the leading end, whereas the opposite upper end 44 is the trailing end of the member 42 upon insertion of the control rod 40 into the fuel assembly 10. Further, the control rod 40 includes a first neutron absorber material 50, preferably in the form of pellets of boron carbide, contained in the chamber 48 and located nearer to the upper trailing end 44 than to the lower leading end of the tubular member 42. Also, a second neutron absorber material 52, preferably in the form of pellets of silver-indium-cadmium, is contained in the chamber 48 and located nearer to the lower leading end 46 than to the upper trailing end 44 of the tubular member 42.

The first neutron absorber material 50 (boron carbide) has a higher neutron absorption cross section absorbing capacity than that of the second neutron absorber material 52 (silver-indium-cadmium), specifically approximately twenty-five percent higher. Further, the second neutron absorber material 52 is greater in quantity than that of the first neutron absorber material 50. In particular, the quantities of the first and second neutron absorber materials 50,52 are represented by the respective lengths thereof. The length of the second material 52 is approximately three times longer than that of the first material 50. That is, the first absorber material 50 extends the upper approximately twenty-five percent of the combined length of the absorber material within the tubular member chamber 48, whereas the second absorber material 52 extends the lower approximately seventy-five percent of the combined length. Thus, the second neutron absorber material 52 has a length approximately three times longer than that of the first neutron absorber material 50.

Like other control rods, the tubular member 42 of the improved control rod 40 is formed by an elongated, thin-walled metallic cladding or tube 54 having respective upper and lower end plugs 56,58 for sealing the opposite upper and lower ends 44,46 of the member 42. The upper end plug 56 has an upwardly extending integrally formed stem section with an externally threaded end 60 for connection to the control mechasism 34. The lower end plug 58 is cone-shaped.

The absorber material pellets 52,50 which, as seen in FIG. 2, preferably have the same diameter, are slidably disposed within the chamber 48 and rest on the lower end plug 58 in a tandemly arranged stack. A plenum spring 62 is interposed between the upper end of the pellet stack and the upper end plug 56 to maintain an axial spaced relationship therebetween to define a space within the tubular member 42 for receiving gases generated by the pellets 50,52 as they absorb neutrons in the control reaction.

Since the boron carbide absorber material is just in the upper twenty-five percent of the absorber material, there is essentially no concern with boron carbide swelling, since it never enters the core until the reactor is at low power or shutdown. Also, there will be no impact on rodded peaking factor at high power level either because (a) rods are not allowed to be inserted deeply, and (b) the same material, i.e., silver-indium-cadmium in this case, is not changed from what is used previously for a particular reactor.

It is thought that the improved control rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A neutron absorber control rod for use in a fuel assembly of a nuclear reactor, said control rod comprising:
   (a) an elongated hollow tubular member having opposite ends and a hermetically sealed chamber defined therein between its said opposite ends, with said opposite ends each being sealed by an end plug, one of said member ends being a leading end and the other of said member ends being a trailing end upon said control rod being inserted into a fuel assembly;
   (b) a first plurality of neutron absorber material pellets contained in said chamber and located nearer to said trailing than to said leading end of said member, each of said pellets consisting essentially of a neutron absorber material having a first neutron absorption cross section;
   (c) a second plurality of neutron absorber material pellets contained in said chamber and located nearer to said leading than to said trailing end of said member, each of said pellets consisting essentially of a neutron absorber material having a second neutron absorption cross section;
   (d) means located in said chamber between said trailing end of said member and said first plurality of pellets for maintaining said first plurality of pellets in stacked relation with and in abutting relation with said second plurality of pellets to define a space within said chamber adjacent said trailing end of said member, said means maintaining said stack of pellets in substantially abutting relation with the end plug sealing said leading end;
   (e) said neutron absorber material of said first plurality of pellets having higher neutron absorption cross section than that of said neutron absorber material of said second plurality of pellets;
   (f) the length of said second plurality of neutron absorber material pellets in stacked relation with said first plurality of neutron absorber material pellets being greater than the length of said first plurality of neutron absorber material pellets;
   (g) said neutron absorber material pellets of said first and second pluralities thereof having substantially the same as diameters;
   (h) said control rod consisting essentially of said hollow tubular member, said end plugs, said first plurality of neutron absorber material pellets, said second plurality of neutron absorber material pellets, and said maintaining means.

2. The control rod as recited in claim 1, wherein said neutron absorption cross section of said first plurality of neutron absorber material pellets is approximately twenty-five percent higher than that of said second plurality of neutron absorber material pellets.

3. The control rod as recited in claim 1, wherein said length of said second plurality of neutron absorber material pellets is approximately three items that of said first plurality of neutron absorber material pellets.

4. The control as recited in claim 1, wherein said first neutron absorber material is boron carbide.

5. The control as recited in claim 1, wherein said second neutron absorber material is silver-indium-cadmium.

6. In combination with a nuclear reactor fuel assembly including a plurality of guide thimbles and a plurality of nuclear fuel rods spaced apart from one another and from said guide thimbles and grouped together in an array organized to generate a neutron flux in said fuel assembly a control rod for insertion into at least one of said guide thimbles of said fuel assembly for regulating said neutron flux, comprising:
   (a) an elongated hollow tubular member having opposite ends and a hermetically sealed chamber defined therein between its ends, one of said member ends being a leading end and the other of said member ends being a trailing end upon insertion of said control rod into said fuel assembly, each of said member ends being sealed by an end plug;

(b) a first plurality of neutron absorber material pellets being contained in said chamber and located nearer to said trailing than to said leading end of said member, each of said pellets being composed of boron carbide;

(c) a second plurality of neutron absorber material pellets being contained in said chamber and located nearer to said leading than to said trailing end of said member, each of said pellets being composed of silver-indium-cadmium; and (d) means located in said chamber between said trailing end of said member and said first plurality of pellets for maintaining said first plurality of pellets in stacked relation with and in abutting relation with said second plurality of pellets to define a space within said chamber adjacent said trailing end of said member, said means maintaining said stack of pellets in substantially abutting relation with the end plug sealing said leading end;

(e) the length of said second plurality of neutron absorber material pellets in stacked relation with said first plurality of neutron absorber material pellets being approximately three times longer than the length of said first plurality of neutron absorber material pellets;

(f) said neutron absorber material pellets of said first and second pluralities thereof having substantially the same diameters;

(h) said control rod consisting essentially of said hollow tubular member, said end plugs, said first plurality of neutron absorber material pellets, said second plurality of neutron absorber material pellets, and said maintaining means.

* * * * *